United States Patent [19]
Reiter et al.

[11] 3,877,662
[45] Apr. 15, 1975

[54] ISOLATED FRAME ON PLATFORMS STABILIZED BY SPINNING BODY

[76] Inventors: Gordon S. Reiter, 13900 Panay Way, Apt. S-321, Marina del Rey, Calif. 90291; Charles P. Rubin, 3139 Coolidge Ave., Los Angeles, Calif. 90066; Ronald V. Swanson, 2023 Redondela Dr., San Pedro, Calif. 90732; Bernard F. Burns, Jr., 906 11th St., Manhattan Beach, Calif. 90266; Anthony J. Iorillo, 551 Paseo Miramar, Pacific Palisades, Calif.

[22] Filed: May 11, 1973

[21] Appl. No.: 359,290

Related U.S. Application Data
[63] Continuation of Ser. No. 151,327, June 9, 1971, abandoned.

[52] U.S. Cl. .............................. 244/1 SA; 74/5.5
[51] Int. Cl. .............................................. B64g 1/10
[58] Field of Search ............ 244/1 SS, 1 SA; 74/5.5

[56] References Cited
UNITED STATES PATENTS

| | | | |
|---|---|---|---|
| 3,168,263 | 2/1965 | Kamm | 244/1 SA |
| 3,442,468 | 5/1969 | Iorillo | 244/1 SA |
| 3,564,931 | 2/1971 | Humphrey | 74/5.5 |

OTHER PUBLICATIONS

Hughes Gyrostat System, Public Relations Dept., Aerospace Group, Hughes Aircraft Company, October, 1967.

"Hughes System Make Giant Improved Satellites Possible," Hughesnews, Hughes Aircraft Company, Vol. 26, No. 22, pp. 1, 4.

"Laboratory Dynamic Model," Public Relations Dept., Aerospace Group, Hughes Aircraft Co., No. 8500273.

*Primary Examiner*—Trygve M. Blix
*Assistant Examiner*—Barry L. Kelmachter
*Attorney, Agent, or Firm*—Allen A. Dicke, Jr.; W. H. MacAllister

[57] ABSTRACT

A despun platform is stabilized by a spinning body. A frame is mounted on an isolation pivot on the despun platform. A directable instrument is mounted on the frame to isolate the instrument from platform perturbations. The isolation pivot substantially isolates the frame from wobble caused by rotation of the spinning body about an axis other than the bearing axis of the despun platform. An optional damping mechanism at the isolation mount activated by relative motion between frame and despun platform damps frame motion with respect to the despun platform. For the case where frame moment of inertia is sufficiently high, nutation damping is provided by this mechanism.

2 Claims, 10 Drawing Figures

PATENTED APR 15 1975 3,877,662
SHEET 1 OF 4
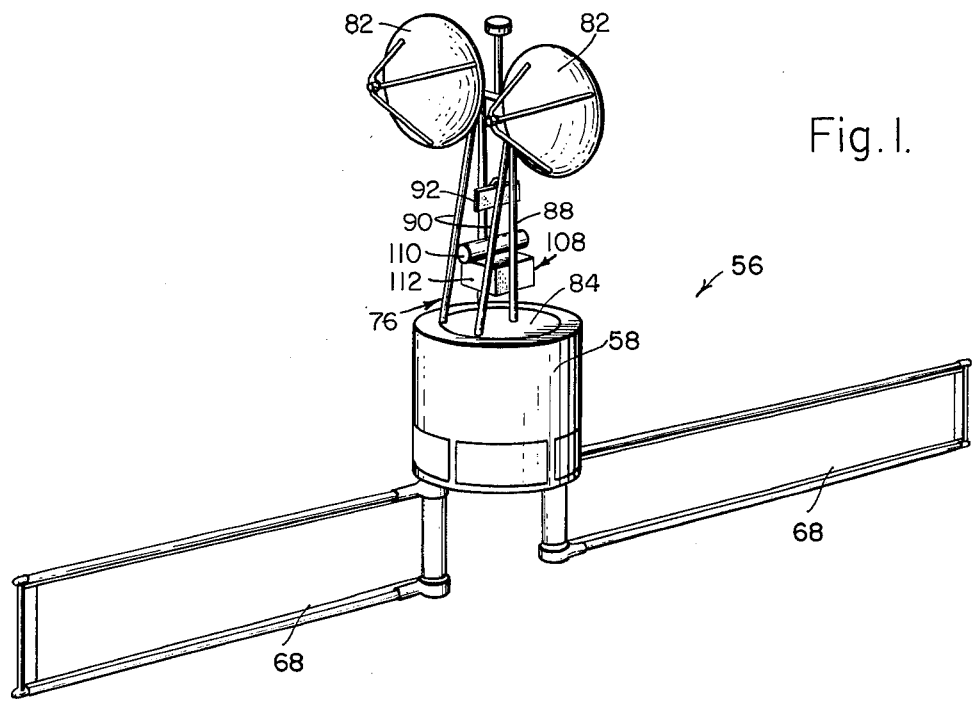
Fig. 1.
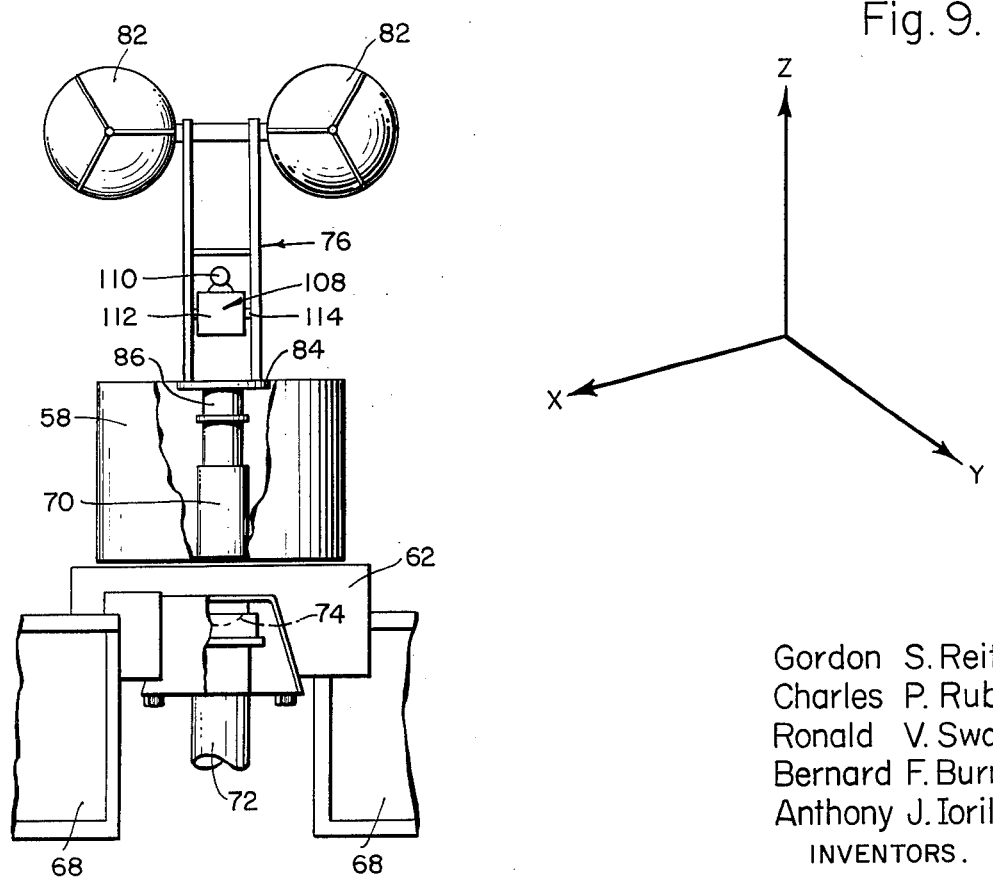
Fig. 2.
Fig. 9.
Gordon S. Reiter,
Charles P. Rubin,
Ronald V. Swanson,
Bernard F. Burns, Jr.
Anthony J. Iorillo,
INVENTORS.
BY.
ALLEN A. DICKE, JR.
AGENT.

3,877,662

ISOLATED FRAME ON PLATFORMS STABILIZED BY SPINNING BODY

CROSS REFERENCE

This application is a continuation of patent application Ser. No. 151,327, now abandoned filed June 9, 1971 by Gordon S. Reiter, Charles P. Rubin, Ronald V. Swanson, Bernard F. Burns, Jr., and Anthony J. Iorillo for "Directable Instrument Carrying Isolated Frame."

BACKGROUND

This invention is directed to a frame carrying a directable instrument which is mounted on a platform through the agency of motion isolation devices, with the platform being stabilized by a spinning body, such as a gyroscopic mass.

The stabilization of devices upon which instruments are mounted, whether on the ground or in space, can be accomplished in several different ways. One of these means for stabilizing a platform comprises the spinning of a flywheel mass. The ordinary flywheel is a rigid structure which rotates about the axis of maximum moment of inertia of the system. This is the only stable rotative condition for an undamped system. A platform is rotatably mounted upon a rotational axis corresponding as closely as possible to the spin axis so the platform has minimum wobble due to minimum deviation between these two axes. Such a platform is normally sufficiently stabilized for use as an instrument or equipment platform. However, isolation from bearing inaccuracies or the slight wobble which is likely to be present can be accomplished by the invention described below.

In another case of similar equipment, the spinning body is a gyroscopic mass which also rotates about the axis of maximum moment of inertia. However, in order to employ useful equipment as part of the gyroscopic mass, instruments and equipment are mounted thereon. However, such instruments or equipment may change in mass or mass distribution. This is particularly true, if liquid fuel tanks or other liquid-containing devices are mounted on the gyroscopic mass, due to fuel usage and liquid sloshing. Of course, the spinning gyroscopic body continues to rotate about the axis of maximum moment of inertia. However, this axis may change slightly from time to time, with the result that the spin axis may move away from the axis of the bearings through which the despun platform is mounted upon the spinning gyroscopic body. This causes wobble of the despun platform. The wobble is a direct function of spin speed and a direct function of rotation of the spinning gyroscopic mass about a spin axis which is other than the bearing axis. The wobble may be conical or it may be purely translational, or a combination of both, depending on whether or not the changes in the mass of the spinning gyroscopic body are in the plane of the center of gravity normal to the spin axis. Such a stabilized device does not need damping to maintain its stability.

Another type of device is described in A. J. Iorillo U.S. Pat. No. 3,442,468, granted May 6, 1969, and directed to a "Nutation Damped Stabilized Device." This patent describes a stabilized despun platform for a situation where the spinning body is rotating about an axis other than the axis of maximum moment of inertia of the system. The ratio of the total transverse moment to the spin inertia is greater than one. Thus, the Iorillo patent teaching permits design flexibility to design a spinning gyroscopic mass which can be longer and not have such a large diameter, in the sense of the axis of rotation. The entire disclosure of that patent is incorporated herein by this reference. The patent teaches that, when a nutation damper is applied to the despun platform, the system can be made stable, even though the spinning body is not rotating about the axis of maximum moment of inertia. Nutation occurs in such circumstances, and nutation frequency is related to the mass and moments of inertia about the various axes, as well as the spin speed. The nutation frequency is normally less than the wobble frequency. The nutation damper of the Iorillo patent is preferably designed for that particular nutation frequency.

SUMMARY

In order to aid in the understanding of this invention, it can be stated in essentially summary form that it is directed to a frame for carrying a directable instrument thereon mounted upon a platform by means of isolation mountings, which platform is rotatably connected to a spinning body which stabilizes the platform.

Accordingly, it is an object of this invention to separate a platform from its stabilizing spinning rotor by means of a flexible joint, and separate a frame from the platform by an appropriately soft spring joint to reduce the response of the frame caused by the forced motion of rotor imbalances. It is a further object to provide an isolated frame for the mounting of optical devices, directional equipment, or radio frequency equipment, which frame is isolated from a platform, and which platform is stabilized by a rotating body, the entire structure being capable of being employed as a space vehicle or as an earth-based, stabilized frame for such optical or radio frequency equipment. It is still a further object to improve, by a sizable factor such as 10, the directional stability of a frame, as compared to the stabilized platform upon which it is mounted.

Other objects and advantages of this invention will become apparent from a study of the following portion of the specification, the claims, and the attached drawings.

BRIEF DESCRIPTION OF THE DRAWINGS

FIG. 1 is a perspective view of a vehicle, in this case, a mock-up of the spacecraft for the testing of instrumentation, having the frame mounted by isolation supports on the platform, in accordance with this invention.

FIG. 2 is a front-elevational view of the instrument test vehicle of FIG. 1, with parts broken away, to show the relatively rotating parts thereof.

FIG. 9 shows rectangular reference axes for FIG. 1.

DESCRIPTION

Figure 3:
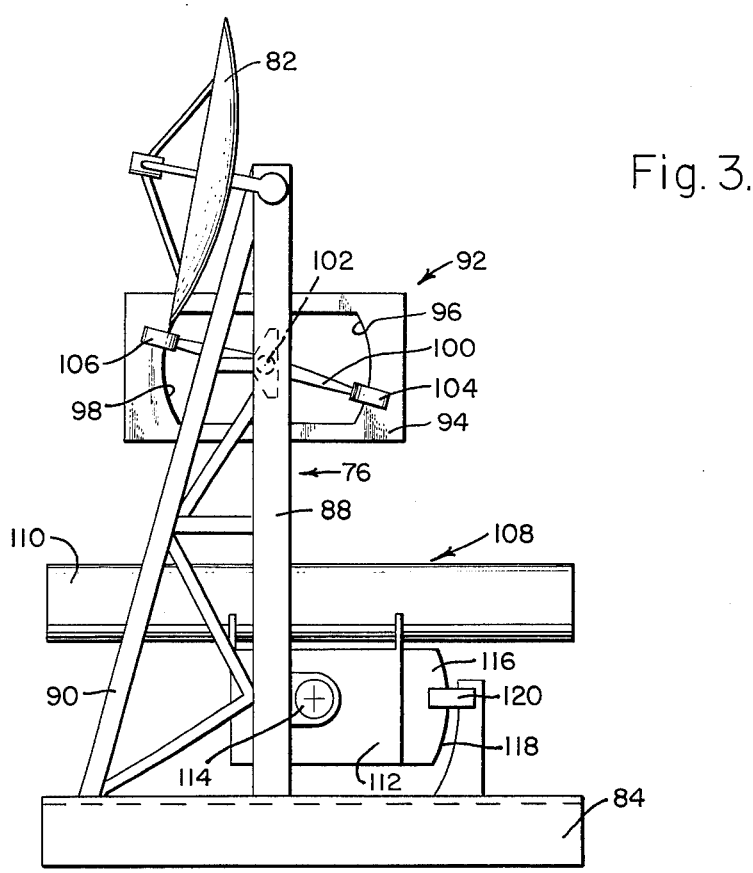
FIG. 3 is an enlarged left side-elevational view of the major part of the upper despun platform and showing the frame mounted in isolated relationship thereto.
Figure 4:
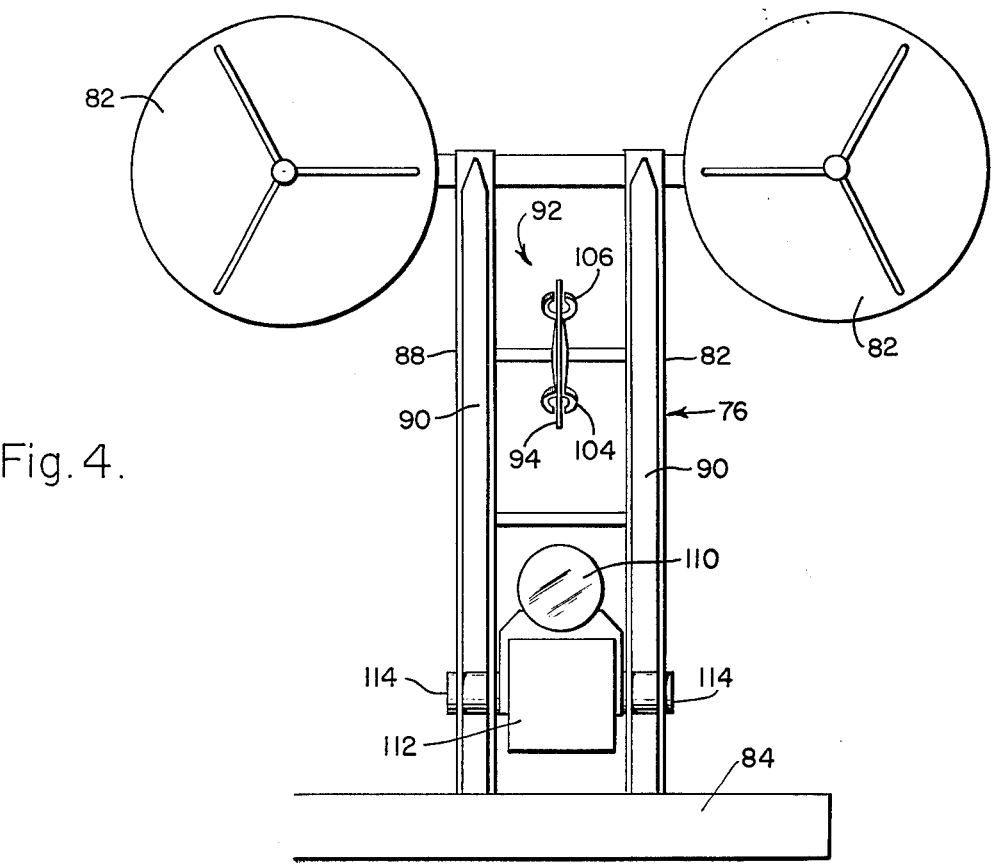
FIG. 4 is a front-elevational view thereof.

FIGS. 5 through 8 illustrate several arrangements of the instrument vehicle with an isolated frame, in accordance with this invention. The simplest form is in FIG. 5, wherein a spinning hollow cylindrical body 10 is illustrated in vertical, axial section. The spinning body 10 has a certain mass, so that it stabilizes structures supported thereon against motion due to external forces and tends to maintain its axis of rotation in one place. The spinning body may be an inert flywheel, or may carry solar cells on the outer surface, while on the interior thereof, there may be locations for instrumentation, equipment, vessels, or the like. Mounted upon the spinning body 10 is an appropriate mounting location for equipment which can be thus rotated without adverse effect on its operation.

It is known that a despun platform 12 can be rotatably mounted with respect to this spinning body 10, and relatively rotated at such a speed that the despun platform has a selected rotation rate with respect to earth-centered space, even zero RPM. This makes the despun platform a suitable place for mounting instrumentation and equipment, the direction of which needs to be controlled with respect to earth-centered space.

As pointed out above, the system may be dynamically stable by employing an inert flywheel for the spinning body, or employ a spinning body which rotates about the axis of maximum moment of inertia. In the special case where the total transverse moment of inertia is greater than the moment of inertia of the spinning body about the spin axis, it is the teaching of Anthony J. Iorillo U.S. Pat. No. 3,442,468 that a nutation damper is effective when mounted upon the despun platform to stabilize the spinning body and the despun platform with respect to nutational movement. The employment of the nutation damper on the despun platform prevents tumbling of the structure, and thus provides stability to the structure.

The despun platform 12 is mounted upon bearing 14 to permit the relative rotation of the spinning body 10 and despun platform 12. Of course, bearing inaccuracies and rotor imbalances cause conical and translational wobble motion of the axis of despun platform 12 in earth-centered space, even when the spinning body is adequately damped for its nutational motion by the nutation damper on despun platform 12. Wobble is caused by the difference between the axis about which the spinning body rotates, and the axis about which the despun platform rotates with respect to the spinning body. This wobble is usually conical, but may be purely translational in a special case, or a combination of both in the general case. The frequency of the wobble is the same as the spin frequency. In accordance with this invention, pivot 16 is mounted on despun platform 12 and carries frame 18 thereon. Pivot 16 permits rotation of frame 18 with respect to the platform about an axis such as to permit free rotation of the frame to stabilize it against one component of the wobble. Frame 18 rotates with despun platform 12, and is thus similarly despun. Frame 18 carries instrumentation or equipment thereon, the pointing accuracy of which is desired to be better than the pointing accuracy of any equipment directly mounted upon despun platform 12. When a nutation damper is required, it is never mounted on the isolated frame, but on the despun platform.

Figure 5:
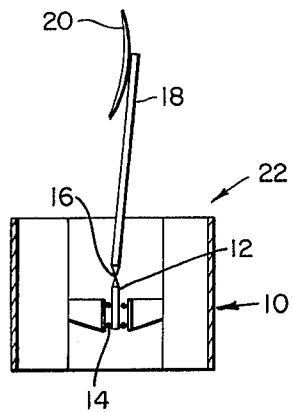
FIG. 5 is a schematic illustration of a second embodiment of the test vehicle.

In one example, antenna 20 is mounted on frame 18, so that its pointing accuracy is enhanced, if compared to mounting thereof on platform 12. The directional axis of antenna 20 is in the plane of the paper and directed to the left in FIG. 5, and is along the X-axis in FIG. 9 and, in order to permit this enhanced accuracy, pivot 16 is a pivot having its axis perpendicular to the paper, on the Y-axis of FIG. 9. Thus, wobble motion of platform 12 in the plane of the paper of FIG. 5 is isolated from frame 18. With a pivot 16 having a single rotational axis, the motion of the despun platform 12 which would cause nodding of the antenna 20 is isolated. Thus, while a single axis of rotational freedom is all that is necessary for improving pointing accuracy, a pivot of greater number of degrees of freedom, such as a ball and socket joint, could be employed to free the frame from rotation on other axes, such as the X-axis. The character of pivot 16 is described in more detail with respect to a specific embodiment below. Vehicle 22 thus provides a frame which is oscillation isolated with respect to and mounted on a platform which, in turn, is stabilized by a spinning body. The vehicle 22, as discussed above, may be an instrumentation and equipment testbed. Appropriate mounting for employment in gravitational environments is described below. On the other hand, it may be operated in free fall environment.

Figure 6:
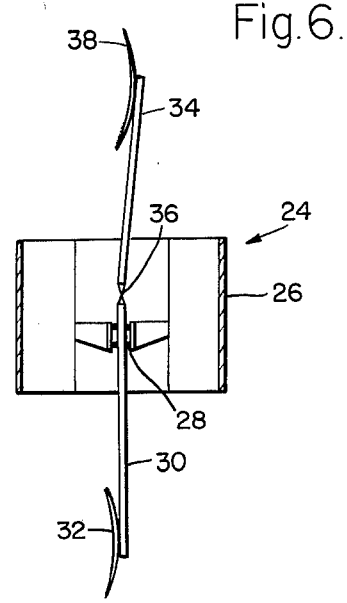
FIG. 6 is similar to FIG. 5, showing a third embodiment.

Vehicle 24 in FIG. 6 is similar to vehicle 22 and has a spinning body 26, which may carry instrumentation and equipment, and which rotatably carries a despun platform 30 on bearing 28. When the total inertia of the system in a direction normal to the spin axis is greater than the moment of inertia of the spinning body 26 about its spin axis, in accordance with the Iorillo patent teaching, the despun platform carries a nutation damper. The despun platform also carries instrumentation or equipment, in this case antenna 32, the direction of which is fairly accurately defined in earth-centered space by means of the rotation of despun platform 30 with respect to spinning body 26. In the case of vehicle 24, frame 34 is mounted upon pivot 36 on the platform 30. This pivot 36 isolates the frame 34 from wobble. This isolation increases the accuracy of the pointing of equipment 38, in this case an antenna, in earth-centered space. In accordance with this figure, vehicle 24 is the same as vehicle 22, except that vehicle 24 has a larger despun platform and has equipment mounted thereon. Where the moment of inertia of the frame 34 about its isolation pivot is sufficiently large, the application of damping to this relative motion can provide sufficient damping in the overall system of spinning body, despun platform and frame that a nutation damper tuned at nutation frequency is not necessary, but the damped frame tuned closer to the wobble frequency than any other frequency will be sufficient to provide stability to the system.

Vehicle 40, in FIG. 7, again has the spinning body 42 which provides stabilization to a despun platform 44. In this case, the despun platform is principally the inner race of bearing 46. Mounted upon despun platform 44, by means of pivot 48, is frame 50. As described above, pivot 48 provides isolation for frame 50 with respect to despun platform 44, in the direction which aids in pointing accuracy of equipment mounted upon frame 50. In this case, frame 50 extends through the inner race of bearing 46 and carries antennas 52 and 54 on opposite ends. It is clear that the antennas are illustrated as devices which have a directional axis, the enhanced pointing accuracy of which is desirable. The vehicle 40 provides a structure with a minimized mass of despun platform, and with a maximized frame 50, which is also despun by being mounted upon pivot 48, which is intentionally nonrotative about the Z-axis.

Figure 7:
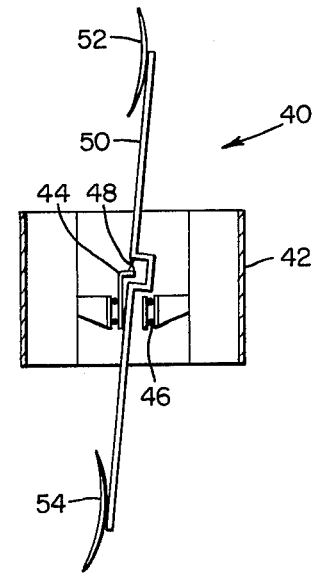
FIG. 7 is similar to FIG. 5 and showing a fourth embodiment.

When the spinning body is rotating about the axis of maximum moment of inertia, no nutation damper is necessary on the despun platform in order to obtain stability. In the case of a spinning body which is rotating about an axis other than the maximum moment of inertia, in accordance with the teaching of the Iorillo patent, it is necessary to place the nutation damper on the despun platform. A nutation damper is more effective, when placed away from the center of gravity of the vehicle. Since the despun platforms 12 and 44 of FIGS. 5 and 7 are fairly small, it is difficult to properly place an effective nutation damper thereon. Nutation damping is required in the special case taught by the Iorillo patent, when the total moment of inertia of the system in any direction transverse to the spin axis is greater than the moment of inertia of the spinning body about its axis. The nutation damper must be mounted upon the despun platform, rather than the isolated frame. Thus, in order to achieve effective nutation damping, instead of the use of a nutation damper under these difficult conditions, nutation damping can be achieved by damping the motion of the frame with respect to the despun platform. Since this damping is tuned to the wobble frequency, or at least its resonant frequency is closer to the wobble frequency than to the nutation frequency, the application of damping to the joint between the frame and the despun platform does not specifically make it a nutation damper. However, in the case of sufficient moment of inertia of the frame about its isolation axis, sufficient damping is available to provide vehicle stability, (activated by motion between the despun platform and the frame).

Figure 8:
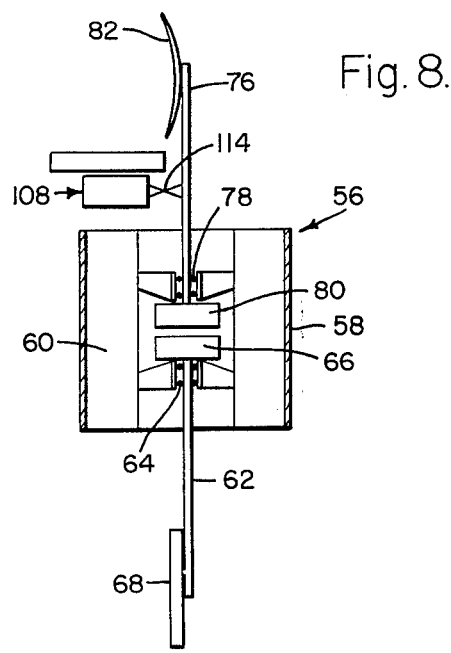
FIG. 8 is similar to FIG. 5 and showing a fifth embodiment, which is quite similar to the preferred embodiment of FIGS. 1 through 4.

FIG. 8 schematically illustrates vehicle 56, which is the preferred embodiment of the instrument test platform and vehicle of this invention, having a frame 108 which is mounted on and isolated from a platform 76 which is despun with respect to and stabilized by a spinning body 58. The vehicle 56 will be generally described with respect to FIG. 8, and will be described in more detail by reference to FIGS. 1 through 4.

The vehicle 56 has a spinning gyroscopic body 58 which rotates about the Z-axis of FIG. 9. The body 58 may have solar cells on the outer surface thereof. Body 58 carries various equipment and instruments, for example in housings 60, secured therein. Some of these housings may be fuel tanks of such nature that the change in fuel quantity therein changes the moment of inertia of the entire spinning body 58. Similarly, the sloshing of fuel in these tanks may also change the moment of inertia. Furthermore, other devices on the spinning body may be movably mounted and, as such, change the moment of inertia or center of mass. This makes the spinning body "non-rigid." The spinning body 58 may be spinning about the axis of maximum moment of inertia. In such a case, no nutation damping is necessary. However, due to changes in mass distribution on the spinning body, its axis of rotation may shift. Wobble is caused whenever the axis of rotation of the spinning body is other than the axis of rotation of the platform with respect to the spinning body. This is different motion than the nutation which becomes a problem when the body is spinning about other than the axis of maximum moment of inertia. In this latter case, a nutation damper is necessary on the despun platform to provide the necessary stability to the system.

As previously described, means for the damping of nutation is necessary whenever the damping ratio of the total system inertia about any axis normal to the axis of spinning with respect to the moment of inertia of the spinning body about its spin axis is greater than one. However, instead of using a nutation damper which is tuned to the nutation frequency, when the frame has a fairly large moment of inertia about its isolation axis with respect to the despun platform, damping of the frame on that isolation pivot, even if tuned to a frequency which is closer to the wobble frequency than the nutation frequency, can supply sufficient damping to prevent loss of system stability due to nutation.

In the schematic showing of FIG. 8, despun platform 62 is mounted upon bearing 64 in the spinning body 58. Motor means 66 is engaged between the spinning body and the despun platform 62 in order to relatively rotate these two parts. The relative rotation is such that despun platform 62 may be driven with respect to the rotating body at such a speed that it is earth-oriented or sun-oriented, or oriented in some other chosen reference coordinates. In this particular case, solar panels 68 are mounted upon despun platform 62, and the despun platform 62 is preferably rotated at such a speed with respect to the spinning body that it is sun-oriented. In FIGS. 1 and 2, the despun platform 62 is illustrated below the spinning body. It is mounted upon bearings in bearing housing 70, and the motor means 66 also acts thereon. The solar panels 68 extend from the despun platform 62.

In order for the vehicle 56 to be employed as an instrument test platform, whereby it can be used in non-space or gravitational environments, pedestal 72 extends upward from a floor support and terminates in a hemispherical air bearing 74, half of which is mounted upon the pedestal and half of which is mounted on despun platform 62. By means of this support, the spinning body 58 can be employed to stabilize both the lower despun platform 62 and the upper despun platform hereinafter described.

As is schematically shown in FIG. 8, upper despun platform 76 is rotatably mounted on bearings 78 which have an axis of rotation substantially about the Z-axis. Upper despun platform 76 is driven with respect to the spinning body 58 by motor means 80. Vehicle 56 conveniently has two despun platforms, as indicated. Despun platform 62 is directed in one set of reference coordinates which could be sun-centered, if the vehicle is an earth-orbiting vehicle, or could be sun-centered when the vehicle is a test vehicle structure on an earth surface mounting. The upper despun platform 76 can then be despun at a different rate for a different purpose. For example, if the vehicle 56 is in earth orbit, despun platform 76 can be rotated with respect to body 58 at such a speed as to direct its antennas 82 toward the earth. In those cases where an orbiting vehicle is not desired, but, instead, a ground-mounted stabilized structure for use as an instrument platform is desired, such as by employment of a pedestal 72, it can be despun to direct its antennas 82 or other instrumentation toward the stars, and the like. In these two illustrations, the relative rotation speed of the two despun platforms 62 and 76 with respect to each other is about 1 revolution per day.

Referring to FIGS. 1 through 4, the bottom of platform 76 is a disc 84 which is mounted flush with the top of rotating body 58. The disc is carried on a shaft 86 which, in turn, is mounted upon suitable bearings for rotation of the upper despun platform 76 with respect to spinning body 58 and the lower despun platform 62. Framework extends upward from the platform. This framework is in the form of uprights 88 and braces 90. These are mounted together by suitable angle members. The antennas 82 are mounted at the top of the uprights 88, and may be directable by means of a pivotal mounting on a pivot axis perpendicular to the plane of the paper in FIG. 3.

In the special case of rotation of the rotating body 58 about an axis other than the maximum moment of inertia, nutation damper 92 is mounted on the despun platform. One of the two movable portions of the nutation damper 92 is directly mounted upon the despun platform. Nutation damper 92 comprises a fixed member 94 which is of magnetic material and has an opening therein defined by arcs 96 and 98. Movable member 100 is mounted on a pivot axis on bearing 102 normal to the plane of the drawing in FIG. 3. Bearing 102 is a special type of low friction, low hysterisis bearing with proportional resilient spring return to the center position, wherein movable member 100 is horizontal in FIG. 3. A suitable bearing is the Bendix flexural pivot, manufactured by the Bendix Corporation, Utica, N.Y., under the mark "Free-Flex." This structure is a frictionless bearing suitable for small angular deflection and is made of flat, crossed springs supporting the relatively rotatable sleeves.

Figure 10:
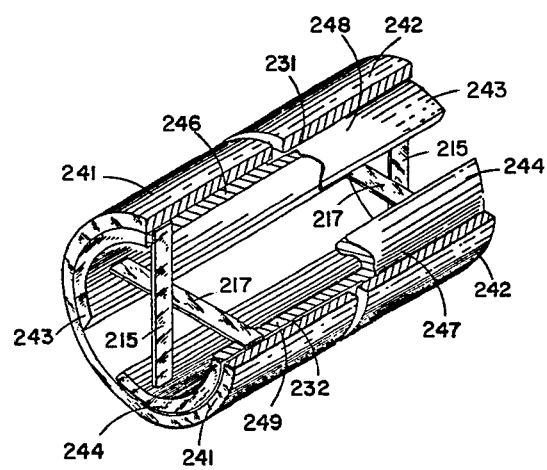
FIG. 10 is an isometric view, with parts broken and parts taken in section of a prior art flexural pivot.

FIG. 10 shows the prior art flexible pivot. There are two outer sleeve means or tubular members 241 and 242 and two arcuate inner elements 243 and 244. The axially aligned outer members 241 and 242 are axially spaced and separated at the peripheral opening. The left tubular member 241 is bonded to the upper arcuate element 243. The right tubular member 242 is likewise bonded to the lower arcuate element 244. The effective angle included between the adjacent edges of the arcuate elements 243 and 244 is 30° and this angle can have a range of 15° to 45°. The adjacent axially extending edges of elements 243 and 244 provide stop means to limit safely the flexing of springs and to limit the relative rotation of members 241 and 242. It is to be noted that arcuate elements 243 and 244 respectively including mounting-surface sections 246 and 248 and axially extending reduced-diameter sections 248 and 249 which project into left and right tubular members 242 and 241 and are radially spaced therefrom. Springs 215 and 217 are firmly bonded in slots in the arcuate elements 243 and 244 so that attachment is maintained under adverse flexing conditions and further so that relative axial movement or tilting between the left and right tubular members 241 and 242 is prevented. Crossed springs 215 and 217 at each end provide a rotational axis adjacent to the intersections of the springs. The two identical constructions provided by tubular member 241 with arcuate element 243 and tubular member 242 with arcuate element 244 can be referred to as two cylindrical means, each having inwardly projecting arcuate structures which have finger-like means extending axially. For the left cylindrical means (members 241 and element 243), the arcuate structure consists of mounting-surface section 246 and reduced-diameter section 248 which form the finger-like means extending axially into and radially spaced from the right cylindrical means (member 242 and element 244). For the right cylindrical means, the arcuate structure is formed by mounting-surface section 247 and the reduced-diameter section 249 which forms the finger-like means extending axially into and radially spaced from the left cylindrical means. With this terminology, the facing parts of arcuate structures are connected by springs 215 and 217 whereby relative rotation between the two cylindrical means on a common axis can be effected. The arcuate structures limit this rotation. The finger-like sections 248 and 249 are spaced radially sufficiently so that contact is prevented during relative rotation of members 241 and 242 when the springs 215 and 217 are flexed. Thus, the movable member 100 is pivotally mounted and spring-centered. Movable member 100 carries C-shaped permanent magnets 104 and 106 at its outer ends. These magnets embrace the fixed member 94 at the arcs therein. Relative movement between the fixed member and movable member cause the magnets to set up current in the fixed member to absorb energy and damp the motion.

FIG. 9 illustrates three rectangular axes as referring to the orientation of the vehicle 56. The Z-axis is the axis of rotation of the spinning body 56, and the axis of rotation of the despun platform 76 with respect to the spinning body may be slightly divergent from the Z-axis, due to mechanical tolerances in the bearings and other structures and due to changes in loading in the non-rigid portion of the rotating body. Wobble of the despun platform 76 thus occurs around the Z-axis. To the extent that this wobble can be resolved into rotation about the X-axis, the wobble does not affect accuracy, because the X-axis substantially represents the direction to the point at which the antennas 82 and other equipment mounted on the despun platform are directed. Thus, only that portion of the wobble which is resolved as rotation around the Y-axis affects accuracy. For this reason, the axis of bearing 102 is parallel to the Y-axis and wobble is isolated on that axis.

Frame 108 is mounted upon upper despun platform 76. Frame 108 comprises a directable device 110, such as a laser, or other highly directional communications equipment, signal equipment or test equipment. The frame also includes that additional equipment as a power supply and control equipment in housing 112 as is necessary to properly operate and/or control the directable device 110. In the case of a laser, the housing 112 carries the power supply and control equipment for the laser which is desirably directly associated with the laser. All of the movable equipment is thus designated as frame 108, and the frame 108 has a center of gravity substantially on the axis of bearing 114. Thus, the frame is isolated from that portion of wobble experienced by upper despun platform 76. The bearing 114 is again a low friction, low hysteresis rotary bearing having an axis of rotation substantially parallel to the Y-axis and having a spring-centering force. The spring-centering force can be inherent in the bearing construction, such as when the Bendix flexural pivot is employed, or may be supplied in a different construction. The spring rate is such that the natural frequency of the mass of frame 108 oscillating on the axis of pivot bearing 114 is tuned to the vehicle wobble frequency to provide maximum isolation.

Damping of the frame 108 with respect to the despun platform 76 is unnecessary, as far as the isolation is concerned, but damping can be provided to more rapidly reduce unwanted motions of frame 108 due to transient excitation of vehicle 92. Furthermore, in the special case of a spinning body rotating about other than the axis of maximum moment of inertia and the mass of frame 108 is a large portion of the mass of platform 76, damping of the frame 108 with respect to despun platform 76 can provide the necessary nutation damper force stability of such systems. While the compromise between the frequency of nutation damping and the natural frequency of frame may reduce damping performance, in such operational situations, such a combined damping arrangement can be more satisfactory from an overall viewpoint.

Damping is accomplished, if desired, in the specific embodiment illustrated in FIGS. 1 through 4 by the installation of a magnetic plate 116 on the rear of housing 112. This magnetic plate has an arcuate surface 118. C-shaped permanent magnet 120 is embraced around the plate 116 and is mounted upon disc 84. Thus, half of the damper is mounted upon the frame and the other half, on the despun platform. When relative motion occurs, the magnet sets up current in the plate to absorb energy from the motion. Of course, the magnet and plate can be reversed, or other types of damping devices can alternatively be employed.

Such isolation of the frame 108 without damping provides a substantial reduction in the amount of oscillation in the frame, as compared to the oscillation in the despun platform around the Y-axis. In a particular structure, the detrimental oscillations have been reduced to about one-tenth of their former value by mounting the frame in isolated manner on the platform stabilized by the spinning body. It is clear that this isolated frame can be employed as a stabilized earth-mounted device which serves as a vehicle for the support of instruments. The several embodiments of FIGS. 5 through 7 illustrate other manners in which the frame may be mounted but, in each case, isolation is accomplished by a pivot axis in a direction suitable for the isolation of the frame from disturbing wobble.

This invention having been described in its preferred embodiment, and several additional embodiments also described, it is clear that this invention is susceptible to numerous modifications and embodiments within the ability of those skilled in the art.

What is claimed is:

1. An instrument-carrying vehicle comprising:
   a gyroscopic mass rotatable on a first axis;
   a despun platform rotatably mounted on said gyroscopic mass to rotate with respect thereto on a second axis and rotatable at a slower speed in selected coordinates than said gyroscopic mass, the difference between said first and second axes causing wobble at the frequency of their relative rotation;
   a nutation damper mounted upon said platform to rotate on an axis substantially normal to said first axis and tuned to a frequency closer to the nutation frequency than any other system frequency to damp nutational movements about the axis of said nutation damper;
   an isolated frame pivotally mounted upon said despun platform on a third axis which is oriented substantially normal to said second axis of rotation, spring means interconnected between said frame and said platform for urging said frame rotationally about said third axis to a centered angular position with respect to said platform, said spring means being related to the mass of said frame so that said frame is tuned at a frequency closer to the spin frequency of said spinnable body than to any other system frequency and a directable instrument mounted on said frame so that wobble of said despun platform is isolated from said frame and said directable instrument by rotation of said isolated frame and said directable instrument mounted thereon on said third axis.

2. The instrument-carrying vehicle of claim 1 further including damping means interconnected between said frame and said platform for absorbing energy from said system as said isolated frame wobbles with respect to said platform due to relative rotation of said gyroscopic mass and said despun platform.

* * * * *